(12) United States Patent
Mertes

(10) Patent No.: US 12,296,973 B2
(45) Date of Patent: May 13, 2025

(54) AIRCRAFT COMPRISING A STRUCTURE, A TANK AND MEANS FOR FASTENING THE TANK TO THE STRUCTURE

(71) Applicant: Airbus Operations SAS, Toulouse (FR)

(72) Inventor: Anthony Mertes, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 18/363,426

(22) Filed: Aug. 1, 2023

(65) Prior Publication Data

US 2024/0116648 A1 Apr. 11, 2024

(51) Int. Cl.
*B64D 37/04* (2006.01)
(52) U.S. Cl.
CPC .................... *B64D 37/04* (2013.01)
(58) Field of Classification Search
CPC ......... B64D 37/02; B64D 37/04; B64D 37/12
See application file for complete search history.

(56) References Cited

U.S. PATENT DOCUMENTS

| 3,659,817 A | 5/1972 | Hendal et al. |
| 3,979,005 A | 9/1976 | Robinson et al. |
| 2015/0360792 A1 | 12/2015 | Faure et al. |
| 2020/0369395 A1 | 11/2020 | Deforet et al. |

FOREIGN PATENT DOCUMENTS

| EP | 3750811 A1 | 12/2020 |
| FR | 3001714 A1 | 8/2014 |
| FR | 3097201 A1 | 12/2020 |

OTHER PUBLICATIONS

French Search Report for corresponding French Patent Application No. 2208023 dated Feb. 17, 2023; priority document.

*Primary Examiner* — Nicholas McFall
(74) *Attorney, Agent, or Firm* — Greer, Burns & Crain, Ltd.

(57) ABSTRACT

An aircraft comprising a structure, a tank housed in the fuselage, and fastening means which comprise a front fastening system, a rear fastening system and a lateral fastening system. The front system comprises a front plate, two lateral connecting rods and a central connecting rod that are fastened between the front plate and the tank. The rear system comprises a rear plate and a rear connecting rod fastened between the rear plate and the tank. The lateral system comprises a lateral connecting rod fastened between the structure and the tank, wherein one of the connection points is behind the other connection point.

7 Claims, 4 Drawing Sheets

AIRCRAFT COMPRISING A STRUCTURE, A TANK AND MEANS FOR FASTENING THE TANK TO THE STRUCTURE

CROSS-REFERENCES TO RELATED APPLICATIONS

This application claims the benefit of French Patent Application Number 2208023 filed on Aug. 2, 2022, the entire disclosure of which is incorporated herein by way of reference.

FIELD OF THE INVENTION

The present invention relates to an aircraft comprising a structure, a tank, in particular a dihydrogen tank, and fastening means which fasten the tank to the structure.

BACKGROUND OF THE INVENTION

In the case of kerosene, which is used to power the engines of an aircraft, it is known to arrange the kerosene tank in a wing of the aircraft.

In order to reduce the consumption of kerosene in aircraft engines, it is known to use dihydrogen as fuel. The tank, which is of cylindrical form, cannot be placed in the wings and it is thus disposed in the fuselage of the aircraft.

The aircraft then comprises a structure to which the tank is fastened by fastening means.

Currently, the fastening means are not ideal, and it is therefore necessary to find a new arrangement.

SUMMARY OF THE INVENTION

An object of the present invention is to provide an aircraft comprising a structure, at least one cylindrical tank and fastening means which fasten each tank to the structure.

To that end, the present invention provides an aircraft comprising:
a fuselage with a structure,
at least one tank housed in the fuselage, and having a vertical longitudinal median plane,
for each tank, fastening means which fasten the tank to the structure, wherein the fastening means comprise:
a front fastening system comprising:
a front plate secured to the structure,
on either side of the vertical longitudinal median plane of the tank, a lateral connecting rod fastened in an articulated manner to the front plate by a first connection point and to the tank by a second connection point, and
at the vertical longitudinal median plane of the tank, a central connecting rod fastened in an articulated manner to the front plate by a first connection point and in an articulated manner to the tank by a second connection point,
a rear fastening system comprising:
a rear plate secured to the structure, and
a rear connecting rod fastened in an articulated manner to the rear plate by a first connection point at the vertical longitudinal median plane of the tank and to the tank by two second connection points that are disposed on either side of the vertical longitudinal median plane of the tank, and
a lateral fastening system comprising a lateral connecting rod fastened in an articulated manner to the structure by a first connection point and to the tank by a second connection point, wherein one of the connection points is behind the other connection point.

Such an arrangement makes it possible to have fastening means which are optimized in particular for the transfer of forces from the tank to the structure.

Advantageously, each connecting rod is doubled.

Advantageously, at least one lateral connecting rod and the central connecting rod of the front fastening system comprise an additional connection point between the front plate and the connecting rod considered, wherein the additional connection point is activated in the event of failure of a primary force path and creates an auxiliary force path between the structure and the tank, and wherein each additional connection point is made up of a clevis realized in the connecting rod or the pair of connecting rods considered and of a pin which is fitted into bores in said clevis and which passes through a bore in the front plate, the diameter of said bore being greater than the diameter of the pin.

Advantageously, the rear connecting rod of the rear fastening system comprises an additional connection point between the rear connecting rod and the tank, wherein the additional connection point is activated in the event of failure of a primary force path and creates an auxiliary force path between the structure and the tank, and wherein the additional connection point is made up of a clevis realized in the rear connecting rod or the pair of rear connecting rods and of a pin which is fitted into bores in said clevis and which passes through a bore in the tank, the diameter thereof being greater than the diameter of the pin.

Advantageously, the front plate is doubled.

Advantageously, the rear plate is doubled.

Advantageously, each front fastening system is fastened to a front beam of the structure, each rear fastening system is fastened to a rear beam of the structure, for each beam, the structure comprises a hoop, wherein the beam is fastened horizontally along a chord of said hoop, and, for each beam, the aircraft comprises a V-shaped bar, the tip thereof being fastened in an articulated manner to the beam and the end of each arm thereof being fastened in an articulated manner to the hoop.

BRIEF DESCRIPTION OF THE DRAWINGS

The features of the invention mentioned above, along with others, will become more clearly apparent upon reading the following description of an exemplary embodiment, said description being given with reference to the appended drawings, in which.

DETAILED DESCRIPTION OF THE PREFERRED EMBODIMENTS

Figure 1:
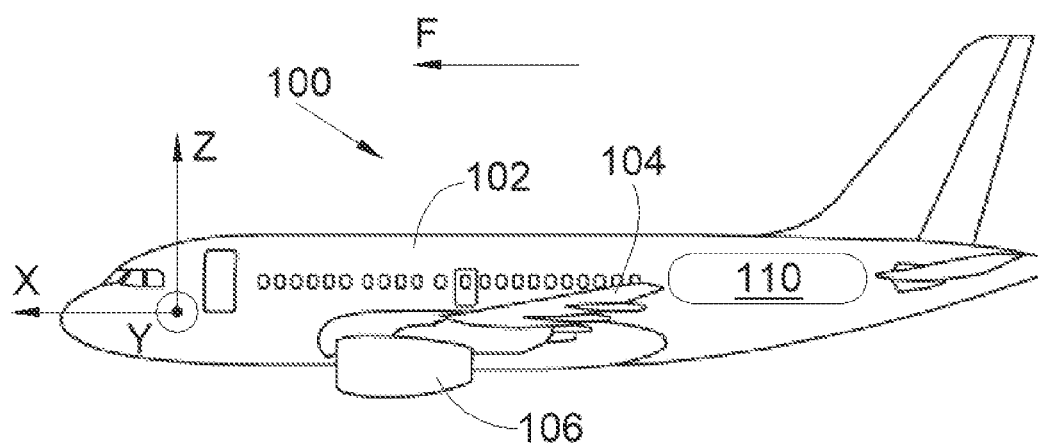
FIG. 1 is a side view of an aircraft according to the invention.

In the following description, terms relating to a position are considered in relation to an aircraft in a normal flight position, which is to say as shown in FIG. 1. The arrow F indicates the direction of forward travel of the aircraft 100.

In the following description, and by convention, X denotes the longitudinal direction of the aircraft, Y denotes the transverse direction which is horizontal when the aircraft is on the ground, and Z denotes the vertical direction which is vertical when the aircraft is on the ground, these three directions X, Y and Z being mutually orthogonal.

FIG. 1 shows an aircraft 100 which comprises a fuselage 102 on each side of which a wing 104 which bears at least one engine 106 operating with dihydrogen or kerosene as fuel is secured.

The fuel is stored in at least one tank 110 which is housed and fastened inside the fuselage 102 and in this case at the rear of the fuselage 102.

Figure 2:
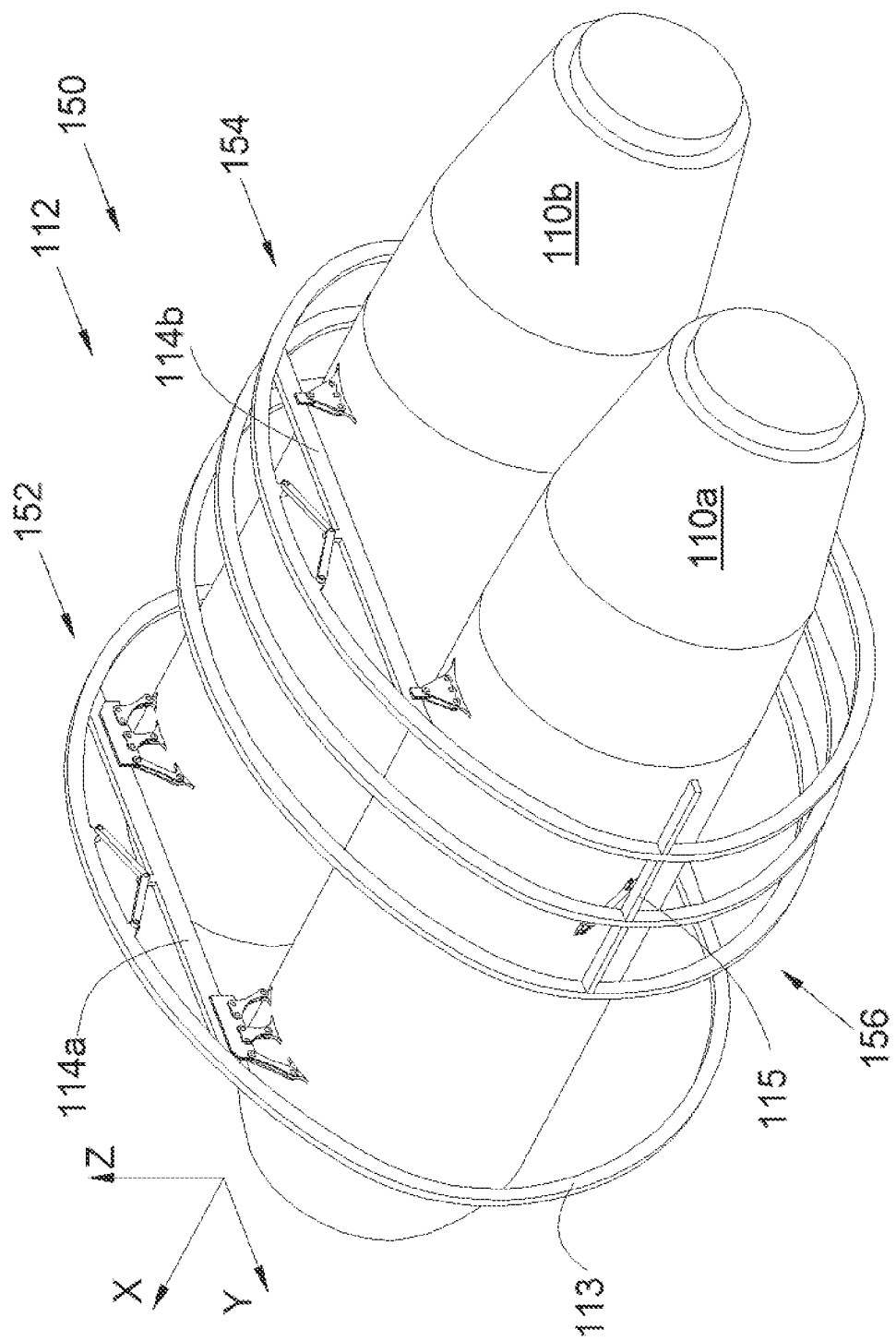
FIG. 2 is a perspective view of two tanks and of the fastening means.

FIG. 2 shows an embodiment in which there are two tanks 110a-b disposed on either side of the median plane XZ of the aircraft 100, but according to another embodiment that is not shown, there is a single tank 110 arranged in the middle on the median plane XZ.

In this case, each tank 110a-b has an elongate form of circular section, but different sections such as rectangular, square or others are possible.

The fuselage 102 of the aircraft 100 comprises a structure 112 which is made up in this case of hoops 113 to the outside of which the skin of the fuselage 102 is fastened, of beams 114a-b which in this case are horizontal and transverse, wherein each beam is fastened to a hoop 113, and a joist 115 which in this case is horizontal and longitudinal and which is fastened to several hoops 113. In the embodiment of the invention presented in FIG. 2, the beams 114a-b and the hoops 113 are common to the two tanks 110a-b and there is a joist 115 for each tank 110a-b. The joist 115 for the tank 110b is in this case hidden by said tank 110b and is on the starboard side. The beams 114a-b are above the tanks 110a-b. In this case, there is a front beam 114a and a rear beam 114b which is at the rear with respect to the front beam 114a.

In order to fasten each tank 110a-b to the structure 112, the aircraft 100 comprises fastening means 150 which comprise a front fastening system 152, a rear fastening system 154 and a lateral fastening system 156.

The following description is given with regard to a single tank 110a, but it applies in the same way to each tank 110a-b.

Figure 3:
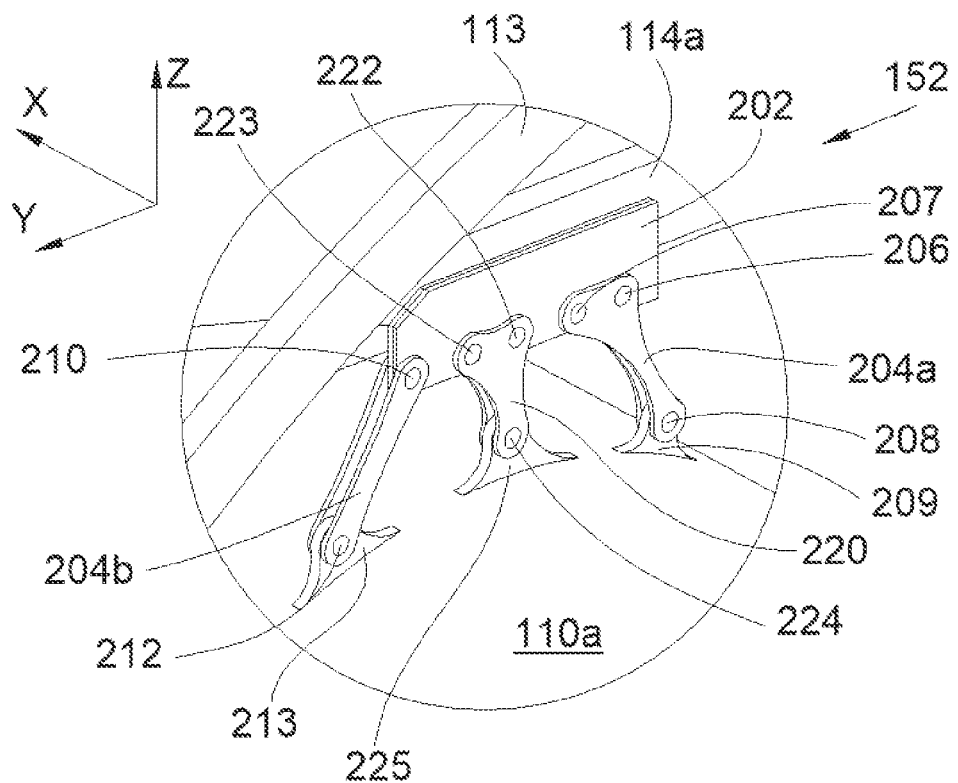
FIG. 3 is a perspective view of the front fastening means.

FIG. 3 shows the front fastening system 152 which is fastened between an upper part of the tank 110a and the structure 112, in this case by way of the front beam 114a. The tank 110a is suspended under the structure 112.

The front fastening system 152 comprises a front plate 202 secured to the structure 112, in this case to the front beam 114a. The front plate 202 extends in a vertical transverse plane perpendicular to the longitudinal direction X. The fastening of the front plate 202 is implemented by any suitable means such as screw/nut systems, rivets, welds, etc.

On either side of a vertical longitudinal median plane of the tank 110a, the front fastening system 152 comprises a lateral connecting rod 204a-b. The vertical longitudinal median plane of the tank 110a is parallel to the median plane XZ of the aircraft 100.

In the embodiment of the invention presented here, the first lateral connecting rod 204a is fastened in an articulated manner to the front plate 202 by a first connection point 206 and to the tank 110a by a second connection point 208, said tank comprising a first lug 209 provided for this purpose, and the second lateral connecting rod 204b is fastened in an articulated manner to the front plate 202 by a first connection point 210 and to the tank 110a by a second connection point 212, said tank comprising a second lug 213 provided for this purpose.

The front fastening system 152 comprises, at the vertical longitudinal median plane of the tank 110a, a central connecting rod 220 arranged between the lateral connecting rods 204a-b. The central connecting rod 220 is fastened in an articulated manner to the front plate 202 by a first connection point 222 and in an articulated manner to the tank 110a by a second connection point 224, said tank comprising a central lug 225 provided for this purpose.

Each lateral connecting rod 204a-b and the central connecting rod 220 are suspended under the front plate 202 and the tank 110a is suspended under each lateral connecting rod 204a-b and the central connecting rod 220.

For safety reasons, each lateral connecting rod 204a-b and the central connecting rod 220 are doubled and the connecting rods of a pair of connecting rods are disposed on either side of the front plate 202 and of the lugs 209, 213 and 225, that is to say in front and behind. Each pair of connecting rods thus forms a clevis in which the front plate 202 and the lugs 209, 213 and 225 are disposed. An inverse arrangement is also possible, in which the lugs 209, 213 and 225 and the front plate 202 each form a clevis in which the connecting rod or the pair of connecting rods is housed.

The fastening at each connection point 206, 208, 210, 212, 222, 224 is preferably a ball joint connection or at least a pivot connection about an axis of rotation parallel to the longitudinal direction X. At each connection point 206, 208, 210, 212, 222, 224, a pin passes through bores in the connecting rods, in the lugs and in the front plate.

The front plate 202 and each connecting rod 204a-b, 220 define, in combination by means of the connection points 206, 208, 210, 212, 222 and 224, a primary force path between the structure 112 and the tank 110a.

Such a front fastening system 152 ensures a transfer of loads in the transverse direction Y and in the vertical direction Z and a transfer of torques about the longitudinal direction X.

For improved safety, at least one lateral connecting rod 204a and the central connecting rod 220 comprise an additional connection point 207, 223 which provides an additional connection between the front plate 202 and the connecting rod 204a, 220 considered. Each additional connection point 207, 223 takes the form of a "waiting fail-safe" fastening point which compensates for a failure of the primary force path, that is to say of at least one of the connecting rods. This means that when a component of the primary force path is damaged, the activation of a waiting fail-safe fastening point creates an auxiliary force path between the structure 112 and the tank 110a.

Each additional connection point 207, 223 is made up in this case of a clevis realized in the connecting rod or the pair of connecting rods 204a, 220 considered and of a pin which is fitted into bores in said clevis and which passes through a bore in the front plate 202, the diameter of said bore being greater than the diameter of the pin. Thus, in normal operation, there is no contact between the pin and the front plate 202, and in the event of breakage of one of the connecting rods, the tank 110a will move and the pin then comes into contact with the front plate 202.

Figure 4:
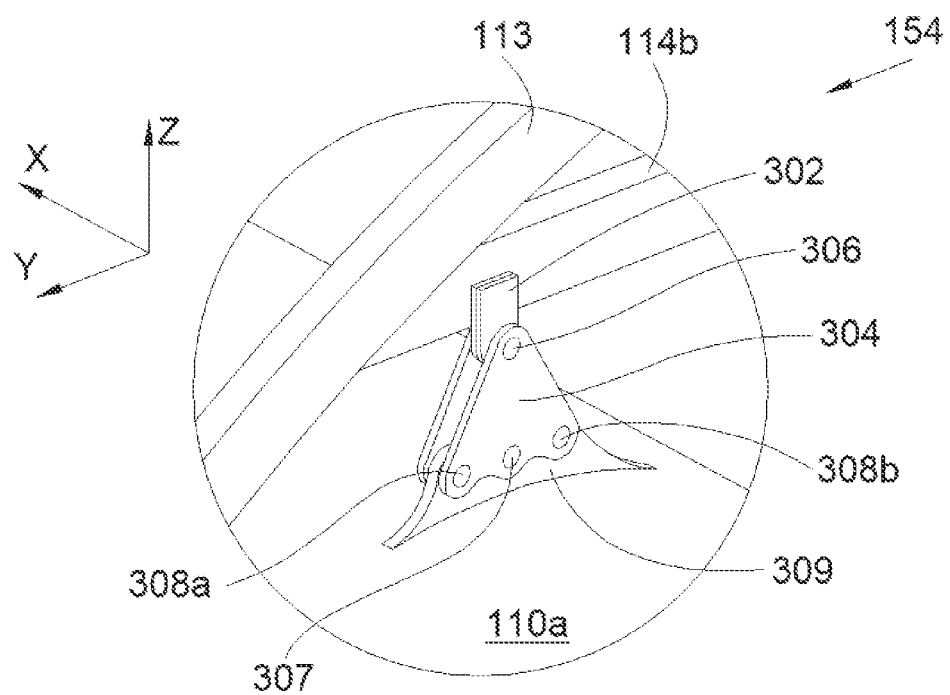
FIG. 4 is a perspective view of the rear fastening means.

FIG. 4 shows the rear fastening system 154 which is fastened between an upper part of the tank 110a and the structure 112, in this case by way of the rear beam 114b. The tank 110a is suspended under the structure 112.

The rear fastening system 154 comprises a rear plate 302 secured to the structure 112, in this case to the rear beam 114b. The rear plate 302 extends in a vertical transverse plane perpendicular to the longitudinal direction X. The fastening of the rear plate 302 is implemented by any suitable means such as screw/nut systems, rivets, welds, etc.

The rear fastening system 154 comprises a rear connecting rod 304 fastened in an articulated manner to the rear plate 302 by a first connection point 306 at the vertical longitudinal median plane of the tank 110a and to the tank 110a by two second connection points 308a-b, said tank comprising a rear lug 309 provided for this purpose. The two second connection points 308a-b are disposed symmetrically on either side of the vertical longitudinal median plane of the tank 110a.

The rear connecting rod 304 is suspended under the rear plate 302 and the tank 110a is suspended under the rear connecting rod 304.

For safety reasons, the rear connecting rod 304 is doubled and the connecting rods 304 are disposed on either side of the rear plate 302 and of the rear lug 309, that is to say in front and behind. The pair of rear connecting rods 304 thus form a clevis in which the rear plate 302 and the lug 309 are disposed. An inverse arrangement is also possible, in which the lug 309 and the rear plate 302 each form a clevis in which the rear connecting rod 304 or the associated pair of rear connecting rods 304 is housed.

The fastening at each connection point 306, 308a-b is preferably a ball joint connection or at least a pivot connection about an axis of rotation parallel to the longitudinal direction X. At each connection point 306, 308a-b, a pin passes through bores in the connecting rods, in the lugs and in the rear plate.

The rear plate 302 and the rear connecting rod 304 define, in combination by means of the connection points 306 and 308a-b, a primary force path between the structure 112 and the tank 110a.

Such a rear fastening system 154 ensures a transfer of loads in the transverse direction Y and in the vertical direction Z.

For improved safety, the rear connecting rod 304 comprises an additional connection point 307 which provides an additional connection between the rear connecting rod 304 and the tank 110a. The additional connection point 307 takes the form of a "waiting fail-safe" fastening point which compensates for a failure of the primary force path, that is to say of the rear connecting rod 304. This means that when a component of the primary force path is damaged, the activation of the waiting fail-safe fastening point creates an auxiliary force path between the structure 112 and the tank 110a.

The additional connection point 307 is made up in this case of a clevis realized in the rear connecting rod 304 or the pair of rear connecting rods 304 and of a pin which is fitted into bores in said clevis and which passes through a bore in the rear lug 309, the diameter of said bore being greater than the diameter of the pin. Thus, in normal operation, there is no contact between the pin and the rear lug 309, and in the event of breakage of the rear connecting rod 304, the tank 110a will move and the pin then comes into contact with the rear lug 309.

Figure 5:
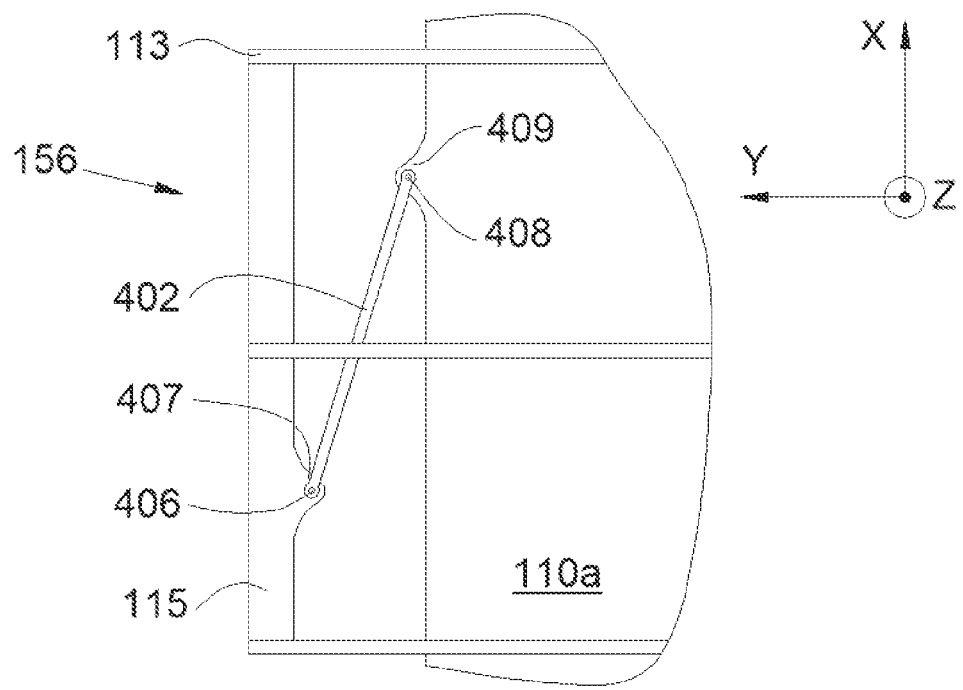
FIG. 5 is a top view of a tank and of the lateral fastening means.

FIG. 5 shows the lateral fastening system 156 which in this case is on one side of the tank 110a. Depending on the space around the tank 110a, the lateral fastening system 156 may be positioned elsewhere around the tank 110a, for example below it.

The lateral fastening system 156 is fastened between the tank 110a and the structure 112, in this case by way of the joist 115.

The lateral fastening system 156 comprises a lateral connecting rod 402 fastened in an articulated manner to the structure 112, in this case to the joist 115, by a first connection point 406, said joist comprising a first lug 407 provided for this purpose, and to the tank 110a by a second connection point 408, said tank comprising a second lug 409 provided for this purpose. The two connection points 406 and 408 are offset with respect to one another along the longitudinal direction X, that is to say that one of the connection points (in this case 406) is behind the other connection point (in this case 408).

The fastening at each connection point 406, 408 is preferably a ball joint connection or at least a pivot connection. At each connection point 406, 408, a pin passes through bores in the lateral connecting rod 402 and in the lugs 407 and 409.

Such a lateral fastening system 156 ensures a transfer of loads in the longitudinal direction X.

With such an installation, the fastening of the tank 110a to the structure 112 is isostatic.

For safety reasons, the front plate 202 and the rear plate 302 are doubled and made up of two sub-plates that are disposed one behind the other in the longitudinal direction X and that are fastened one against the other by any suitable fastening means.

As explained above, for each beam 114a-b, the structure 112 comprises a hoop 113, wherein the beam 114a-b is fastened horizontally along a chord of said hoop 113. For each beam 114a-b, the aircraft 100 comprises a V-shaped bar 120, the tip thereof being fastened in an articulated manner to the beam 114a-b, in particular in the middle of said beam 114a-b, that is to say at the median plane XZ of the aircraft 100, and the end of each arm thereof being fastened in an articulated manner to the hoop 113. The ends of the arms of the bar 120 are disposed on either side of the median plane XZ of the aircraft 100. The fastenings of the bar 120 to the beam 114a-b and to the hoop 113 are preferably ball joint connections or at least pivot connections about an axis of rotation parallel to the longitudinal direction X.

The bar 120 makes it possible to limit the flexion of the beam 114a-b and to ensure a transfer of forces to the structure of the fuselage 102.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   a fuselage with a structure,
   at least one tank housed in the fuselage and having a vertical longitudinal median plane, and,
   for the at least one tank, fastening means which fastens the at least one tank to the structure, wherein the fastening means comprises:
   a front fastening system comprising:
   a front plate secured to the structure, a first lateral connecting rod on a first side of the vertical longitudinal median plane of the at least one tank and a second lateral connecting rod on a second side of the vertical longitudinal median plane opposite the first side of the vertical longitudinal median plane, wherein each of the first and second lateral connecting rods is fastened in an articulated manner to the front plate by a first connection point and to the at least one tank by a second connection point, and at the vertical longitudinal median plane of the at least one tank, a central connecting rod fastened in an articulated manner to the front plate by a first connection point and in an articulated manner to the at least one tank by a second connection point, a rear fastening system comprising:

a rear plate secured to the structure, and a rear connecting rod fastened in an articulated manner to the rear plate by a first connection point at the vertical longitudinal median plane of the at least one tank and to the at least one tank by two second connection points that are disposed on either side of the vertical longitudinal median plane of the at least one tank, and a lateral fastening system comprising a third lateral connecting rod fastened in an articulated manner to the structure by a first connection point and to the at least one tank by a second connection point, wherein one of the first and second connection points is behind the other of the first and second connection points.

2. The aircraft according to claim 1, wherein the rear connecting rod is doubled.

3. The aircraft according to claim 1, wherein at least one of the first and second lateral connecting rods and the central connecting rod of the front fastening system comprise an additional connection point between the front plate and the at least one of the first and second lateral connecting rods and the central connecting rod, wherein the additional connection point is activated in case of failure of a primary force path and creates an auxiliary force path between the structure and the at least one tank, and wherein each additional connection point is made up of a clevis in the at least one of the first and second lateral connecting rods or both the first and second lateral connecting rods and of a pin which is fitted into bores in said clevis and which passes through a bore in the front plate, a diameter of said bore being greater than a diameter of the pin.

4. The aircraft according to claim 1, wherein the rear connecting rod of the rear fastening system comprises an additional connection point between the rear connecting rod and the at least one tank, wherein the additional connection point is activated in case of failure of a primary force path and creates an auxiliary force path between the structure and the at least one tank, and wherein the additional connection point is made up of a clevis realized in the rear connecting rod and of a pin which is fitted into bores in said clevis and which passes through a bore in the at least one tank, a diameter of the bore being greater than a diameter of the pin.

5. The aircraft according to claim 1, wherein the front plate is doubled.

6. The aircraft according to claim 1, wherein the rear plate is doubled.

7. The aircraft according to claim 1, wherein each front fastening system is fastened to a front beam of the structure, wherein each rear fastening system is fastened to a rear beam of the structure, wherein, for each beam, the structure comprises a hoop, wherein the beam is fastened horizontally along a chord of said hoop, and wherein, for each beam, the aircraft comprises a V-shaped bar, a tip thereof being fastened in an articulated manner to the beam and an end of each arm thereof being fastened in an articulated manner to the hoop.

* * * * *